US008312269B2

(12) United States Patent
Campello de Souza

(10) Patent No.: US 8,312,269 B2
(45) Date of Patent: Nov. 13, 2012

(54) CHALLENGE AND RESPONSE ACCESS CONTROL PROVIDING DATA SECURITY IN DATA STORAGE DEVICES

(75) Inventor: Jorge Campello de Souza, Cupertino, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 976 days.

(21) Appl. No.: 11/946,714

(22) Filed: Nov. 28, 2007

(65) Prior Publication Data

US 2009/0138727 A1 May 28, 2009

(51) Int. Cl.
*H04L 9/32* (2006.01)
*H04L 29/06* (2006.01)
*H04L 9/00* (2006.01)
*G06F 11/30* (2006.01)

(52) U.S. Cl. ......... 713/168; 713/150; 713/193; 380/277
(58) Field of Classification Search ............... 380/255, 380/259, 262, 277–286; 713/150, 164–168, 713/171–172, 189, 193
See application file for complete search history.

(56) References Cited

U.S. PATENT DOCUMENTS

| | | | | |
|---|---|---|---|---|
| 6,085,323 | A * | 7/2000 | Shimizu et al. | 713/150 |
| 6,266,421 | B1 * | 7/2001 | Domyo et al. | 380/286 |
| 6,347,145 | B2 * | 2/2002 | Kato et al. | 380/284 |
| 6,615,264 | B1 | 9/2003 | Stoltz et al. | |
| 7,137,012 | B1 * | 11/2006 | Kamibayashi et al. | 713/193 |
| 7,506,367 | B1 * | 3/2009 | Ishibashi | 726/10 |
| 2003/0028787 | A1 * | 2/2003 | Fayed et al. | 713/189 |
| 2003/0035548 | A1 * | 2/2003 | Kwan | 380/286 |
| 2003/0161473 | A1 * | 8/2003 | Fransdonk | 380/277 |
| 2003/0172268 | A1 * | 9/2003 | Walmsley et al. | 713/168 |
| 2003/0210791 | A1 * | 11/2003 | Binder | 380/277 |
| 2004/0010700 | A1 * | 1/2004 | Mont | 713/189 |
| 2004/0083364 | A1 * | 4/2004 | Andreaux et al. | 713/165 |
| 2004/0114765 | A1 * | 6/2004 | Liardet et al. | 380/277 |
| 2005/0044045 | A1 * | 2/2005 | Pelly et al. | 705/51 |
| 2005/0259816 | A1 * | 11/2005 | Han et al. | 380/44 |
| 2006/0209584 | A1 * | 9/2006 | Devadas et al. | 365/52 |
| 2007/0234068 | A1 * | 10/2007 | Silverbrook et al. | 713/189 |
| 2008/0273697 | A1 * | 11/2008 | Greco et al. | 380/44 |
| 2009/0154710 | A1 * | 6/2009 | Brier et al. | 380/286 |
| 2010/0161994 | A1 * | 6/2010 | Serret Avila et al. | 713/189 |

OTHER PUBLICATIONS

Larry Swezey et al., "Safeguarding Your Data with Hitachi Bulk Data Encryption," pp. 1-2, 2007.
"Challenge-Response Authentication," Wikipedia, The Free Encyclopedia, May 5, 2007, pp. 1-2, http://en.wikipedia.org/wiki/Challenge-response_authentication.

(Continued)

*Primary Examiner* — Darren B Schwartz
(74) *Attorney, Agent, or Firm* — Steven J. Cahill

(57) ABSTRACT

Techniques for securing data stored on a data storage device are provided. The data storage device encrypts the data using a bulk encryption key and stores the bulk encryption key in non-volatile memory in an encrypted format. The data storage device generates a challenge and response pair, wraps a secret key with the response to generate a wrapped secret key, and stores the challenge and the wrapped secret key in the non-volatile memory. The data storage device authenticates a host by reading the challenge and the wrapped secret key from the non-volatile memory, erasing the challenge and the wrapped secret key from the non-volatile memory, sending the challenge to the host, receiving the response from the host, and unwrapping the wrapped secret key using the response from the host to regenerate the secret key.

15 Claims, 4 Drawing Sheets

OTHER PUBLICATIONS

"Kerberos (Protocol)," Wikipedia, The Free Encyclopedia, Aug. 26, 2007, pp. 1-4, http://en.wikipedia.org/wiki/Kerberos_%28protocol%29.

Network Working Group, C. Kaufman, "DASS, Distributed Authentication Security Service," Digital Equipment Corporation, Sep. 1993, pp. 1-119.

"Key Wrap," Wikipedia, The Free Encyclopedia, Dec. 25, 2006, pp. 1-2, http://en.wikipedia.org/wiki/Key_Wrap.

"Working document: IPTV Security Aspects," International Telecommunication Union, Focus Group on IPTV, 3rd FG IPTV meeting: Mountain View, Jan. 22-26, 2007, pp. 1-20.

\* cited by examiner

CHALLENGE AND RESPONSE ACCESS CONTROL PROVIDING DATA SECURITY IN DATA STORAGE DEVICES

BACKGROUND OF THE INVENTION

The present invention relates to data storage devices, such as hard disk drives, and more particularly, to techniques for providing data security for data storage devices.

Access control mechanisms are techniques that are implemented to provide security to data stored on hard disk drives and other data storage devices. Password authentication can be used to provide access control. A major drawback of password authentication is that it provides no real protection against interface attacks.

BRIEF SUMMARY OF THE INVENTION

According to some embodiments of the present invention, a data storage device includes non-volatile memory that stores data. The data storage device encrypts the data using a bulk encryption key and stores the bulk encryption key in non-volatile memory in an encrypted format. The data storage device generates a challenge and response pair, wraps a secret key with the response to generate a wrapped secret key, and stores the challenge and the wrapped secret key in the non-volatile memory. The data storage device authenticates a host by reading the challenge and the wrapped secret key from the non-volatile memory, erasing the challenge and the wrapped secret key from the non-volatile memory, sending the challenge to the host, receiving the response from the host, and unwrapping the wrapped secret key using the response from the host to regenerate the secret key.

Various objects, features, and advantages of the present invention will become apparent upon consideration of the following detailed description and the accompanying drawings.

DETAILED DESCRIPTION OF THE INVENTION

Figure 1:
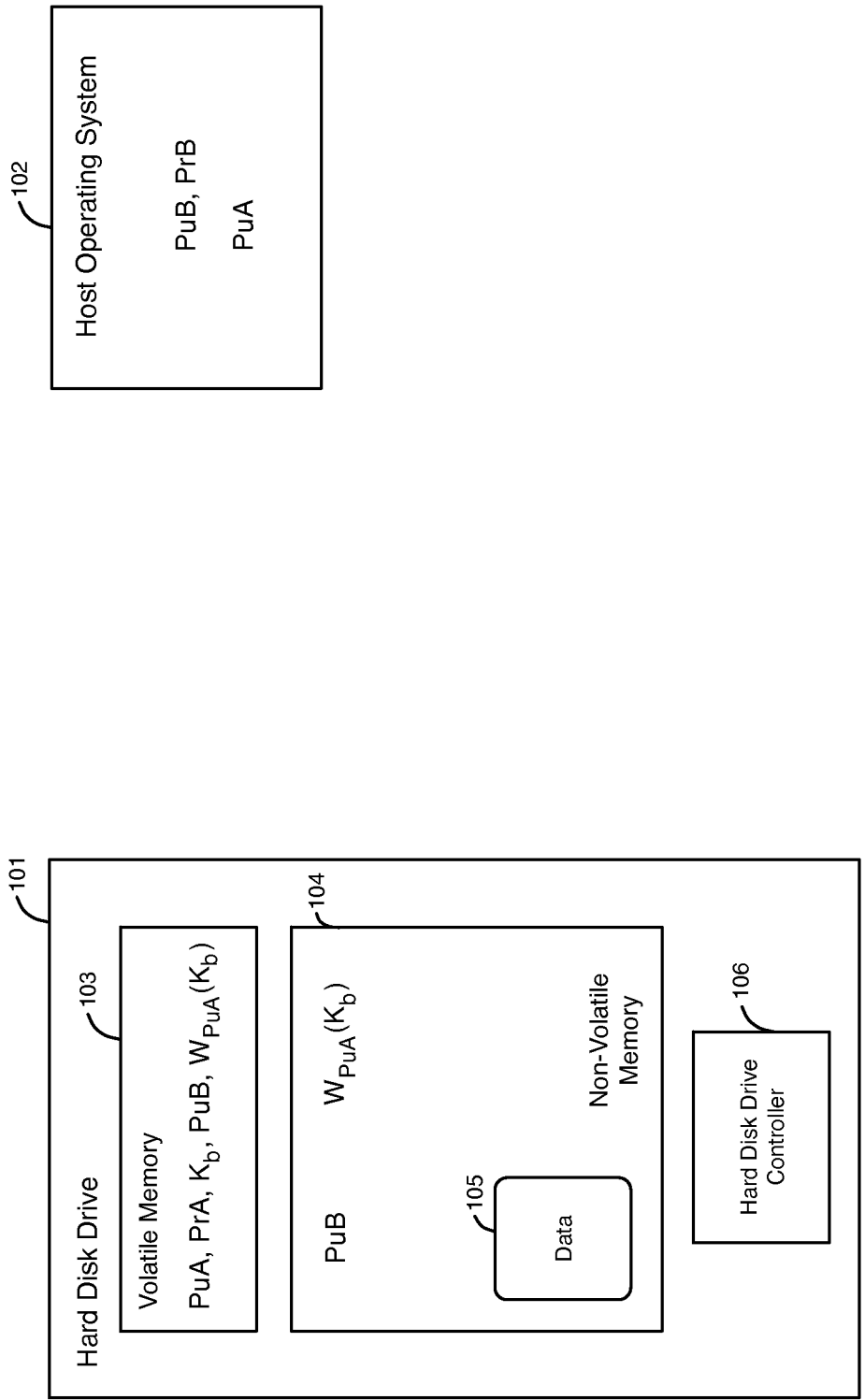
FIG. 1 illustrates an example of a technique for securing data stored on a hard disk drive using asymmetric public and private encryption keys, according to an embodiment of the present invention.

Some embodiments of the present invention relate to techniques for providing data security using challenge and response access controls. Various embodiments of the present invention are now described in detail. FIG. 1 illustrates an example of a technique for securing data stored on a hard disk drive using asymmetric public and private encryption keys, according to an embodiment of the present invention.

The system of FIG. 1 includes a hard disk drive 101 and a host operating system 102. Hard disk drive 101 includes volatile memory 103, a hard disk 104, and a hard disk drive controller 106. Volatile memory 103 can be, for example, semiconductor random access memory (RAM). Hard disk 104 is a magnetic hard disk that contains non-volatile memory. A user generates user data 105 through host operating system 102, or alternatively, another type of host system. Hard disk drive 101 stores data 105 on hard disk 104. Controller 106 runs software code for controlling many of the functions of hard disk drive 101, including data security and access control functions, according to some embodiments of the present invention.

Hard disk drive 101 and host operating system 102 can be on the same computer machine or on separate computer machines. If hard disk drive 101 and host operating system 102 are on separate computer machines, drive 101 and host 102 can communicate with each other over a network, e.g., a local area network or wide area network. If hard disk drive 101 and host 102 are on the same computer machine, drive 101 and host 102 can communicate with each other through, e.g., a bus, such as Small Computer System Interface (SCSI) or FireWire.

Although many embodiments of the present invention are described herein in the context of magnetic hard disk drives, it should be understood that the techniques of the present invention can be applied to other types of data storage devices, such as optical disk drives, flash memory devices, or other data storage devices having non-volatile memory.

One or more keys are used to encrypt the data 105 stored on hard disk drive 101. The one or more keys are put under access control to prevent an unauthorized user from obtaining access to the key(s) and decrypting data 105. In the example of FIG. 1, data 105 is encrypted with a bulk encryption key $K_b$ in order to protect data 105 from unauthorized access and also to associate data 105 with host 102.

During an enrollment process, the host 102 sends its public key (PuB) to the drive 101 with a request for generating secure storage for its data. The drive 101 then generates a public and private key pair (PuA, PrA) to be used for authenticating with the host 102. The drive 101 also generates a bulk encryption key $K_b$ that will be used to encrypt the data associated with host 102.

Drive 101 wraps bulk encryption key $K_b$ with the public key (PuA) of the authentication authority to calculate $W_{PuA}(K_b)$. Wrapping involves encryption with integrity measurements (e.g., using hash functions). After $K_b$ has been wrapped with PuA, $K_b$ can only be recovered by unwrapping $W_{PuA}(K_b)$ with private key PrA. An example of an encryption technique that can be used for bulk encryption with embodiments of the present invention is 256-bit advanced encryption standard (AES). Keys PuA, PrA, PuB, $K_b$ and $W_{PuA}(K_b)$ are temporarily stored in volatile memory 103.

Drive 101 then stores PuB and $W_{PuA}(K_b)$ in hard disk 104. Because $K_b$ is wrapped with PuA, $K_b$ cannot be recovered from the surface of the hard disk 104. However, a technique is needed to store the private key PrA in a secure manner so that an attacker cannot steal PrA from disk 104 in drive 101.

Figure 2:
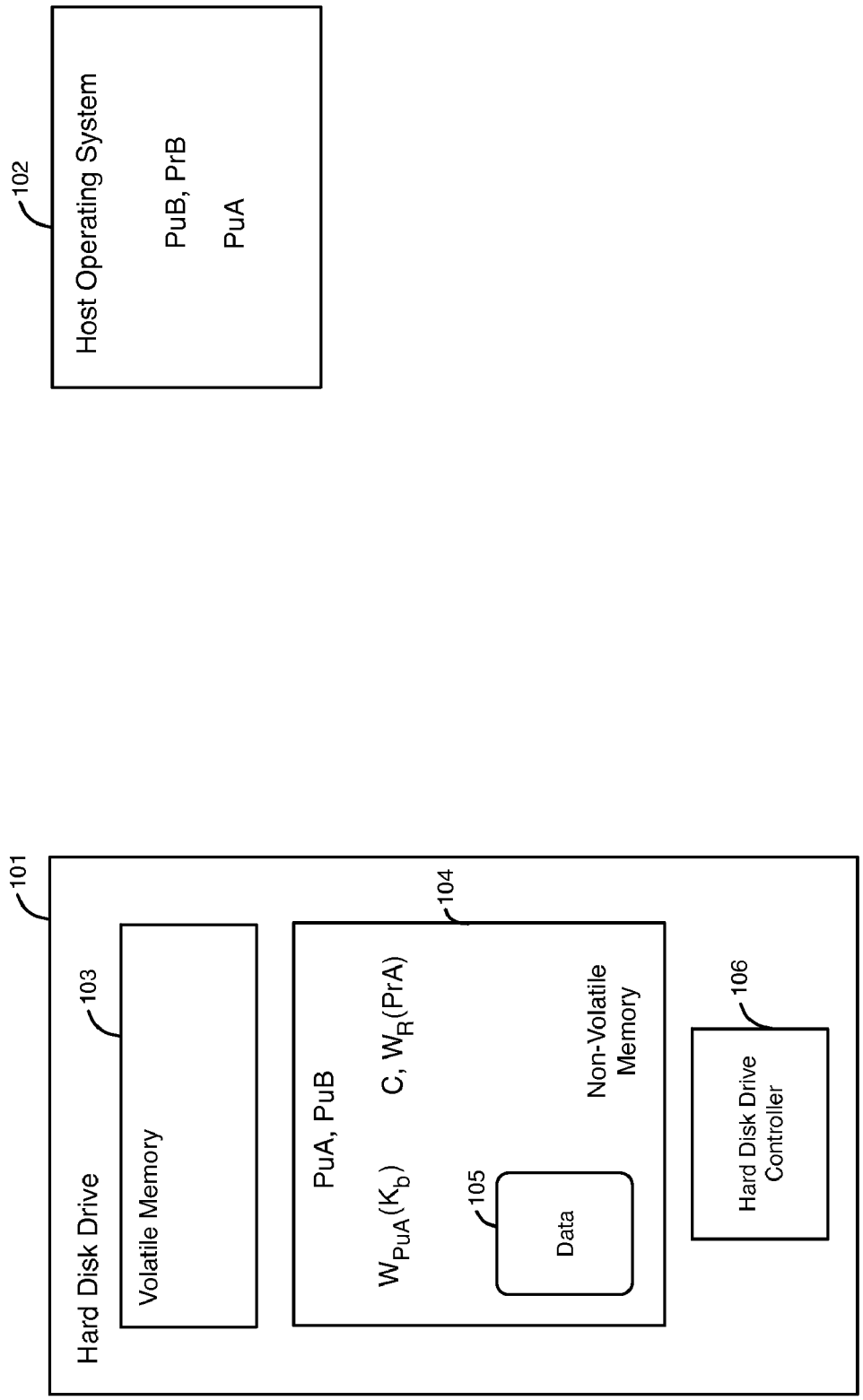
FIG. 2 illustrates an example of a technique for securing data stored on a hard disk drive using challenge and response pairs, according to an embodiment of the present invention.

FIG. 2 illustrates an example of a technique for securing data stored on a hard disk drive using challenge and response pairs, according to an embodiment of the present invention. According to the data security technique of FIG. 2, hard disk drive 101 uses public key PuB to generate a challenge and response pair. R is a random number (e.g., 256 bits) and C is a challenge number. The random number R is the correct response to the challenge C. For example, the challenge number C can be the random number R encrypted with the public key PuB of host 102, i.e., $C=E_{PuB}(R)$. It follows that the random number R equals the challenge number C decrypted with the private key PrB of host 102, i.e., $R=D_{PrB}(C)$. The random number and the challenge number can, for example, include characters that are represented by binary codes. Hard disk drive 101 can also perform a technique for storing private key PrA on drive 101 in a secure manner that is not vulnerable to brute force attempts to read PrA directly from the surface of the hard disk. Hard disk drive 101 wraps the secret private key PrA of the authentication credential of drive 101 with random number R to calculate $W_R(PrA)$, where $W_R(\ )$ indicates the wrap of a number using R. Then, drive 101 erases random number R and the private key PrA from volatile memory 103. Drive 101 stores the challenge number C, $W_{PuA}(K_b)$, PuA, PuB and $W_R(PrA)$ on hard disk 104. As a result, not enough information is stored on hard disk 104 to recover key $K_b$.

In order to recover the user data 105, the private key PrA first has to be recovered by unwrapping $W_R(PrA)$ using random number R. Then, PrA is used to unwrap $W_{PuA}(K_b)$ to recover $K_b$. Key $K_b$ is then used to decrypt data 105. Thus, data 105 can only be recovered with random number R.

Host 102 requests a challenge from hard disk drive 101 to initiate the authentication process. Hard disk drive 101 sends the challenge, i.e., the encrypted random number $C=E_{PuB}(R)$, to host 102. Host 102 then uses its private key PrB to decrypt the challenge C to recover the random number R. Host 102 then sends R to drive 101. After receiving R, drive 101 uses R to unwrap private key PrA from $W_R(PrA)$. Because the wrapping function has integrity measurements, host 102 is authenticated in this process. Now that the drive 101 has recovered PrA, it can recover $K_b$ by unwrapping $K_b$ from $W_{PuA}(K_b)$.

The technique of FIG. 2 securely hides the authentication information needed by the hard disk drive in order to perform authentication. Embodiments of the present invention can also apply to any device locking data/resources to a host authority. If a secret S (e.g., a symmetric or asymmetric secret key) is called, then the hard disk drive pre-computes a challenge and response pair (C, R), for the host authority.

The hard disk drive wraps the secret S (e.g., private key PrA) with the response R of the challenge. In other words, the hard disk drive computes $W_R(S)$, where the wrapping function both encrypts and provides integrity measurements. Alternatively, the hard disk drive can wrap the secret S with a number R' that is a function of the response R, that is $R'=f(R)$. The function f( ) can be, for example, a padding function, a trimming function or a hash function. The hard disk drive erases S from the volatile memory 103. The hard disk drive also stores $W_R(S)$ and C on the hard disk. During authentication, the host system returns the response R to the hard disk drive after receiving the challenge C from the hard disk drive. The hard disk drive then computes the number $R'=f(R)$ using the function and the response R, and unwraps $W_{R'}(S)$ using number R'.

In this situation, S cannot be recovered from information on hard disk 104. R is never stored on hard disk 104. R is only stored in volatile memory 103. To recover S, the hard disk drive 101 needs random number R. The only way for hard disk drive 101 to get random number R is to recover it from the challenge number C. The only system capable of generating R from C is the host operating system 102.

The host 102 can start the authentication process by requesting a challenge from the hard disk drive (HDD). The HDD then sends challenge number C to host 102. The host returns a random number in response to receiving C. Hard disk drive 101 can then recover secret S using the random number received from the host and authenticate itself to the host 102.

To secure all the data and resources that are associated with the host operating system 102, the encryption key $K_b$ that secures the user data 105 is wrapped with the secret S. In this manner, data 105 can be recovered only after the authentication. No amount of tampering with hard disk drive 101 will reveal the secured information R, $K_b$, or S. Drive 101 and host 102 can also use digital certificates to provide an additional assurance that they are communicating with each other, as opposed to an unauthorized computer system that is intercepting their communications.

According to an alternative embodiment, the random number R and the bulk encryption key $K_b$ can be wrapped with a symmetric key (i.e., a private key) instead of an asymmetric key (i.e., a public key unwrapped by a private key).

Figure 3:
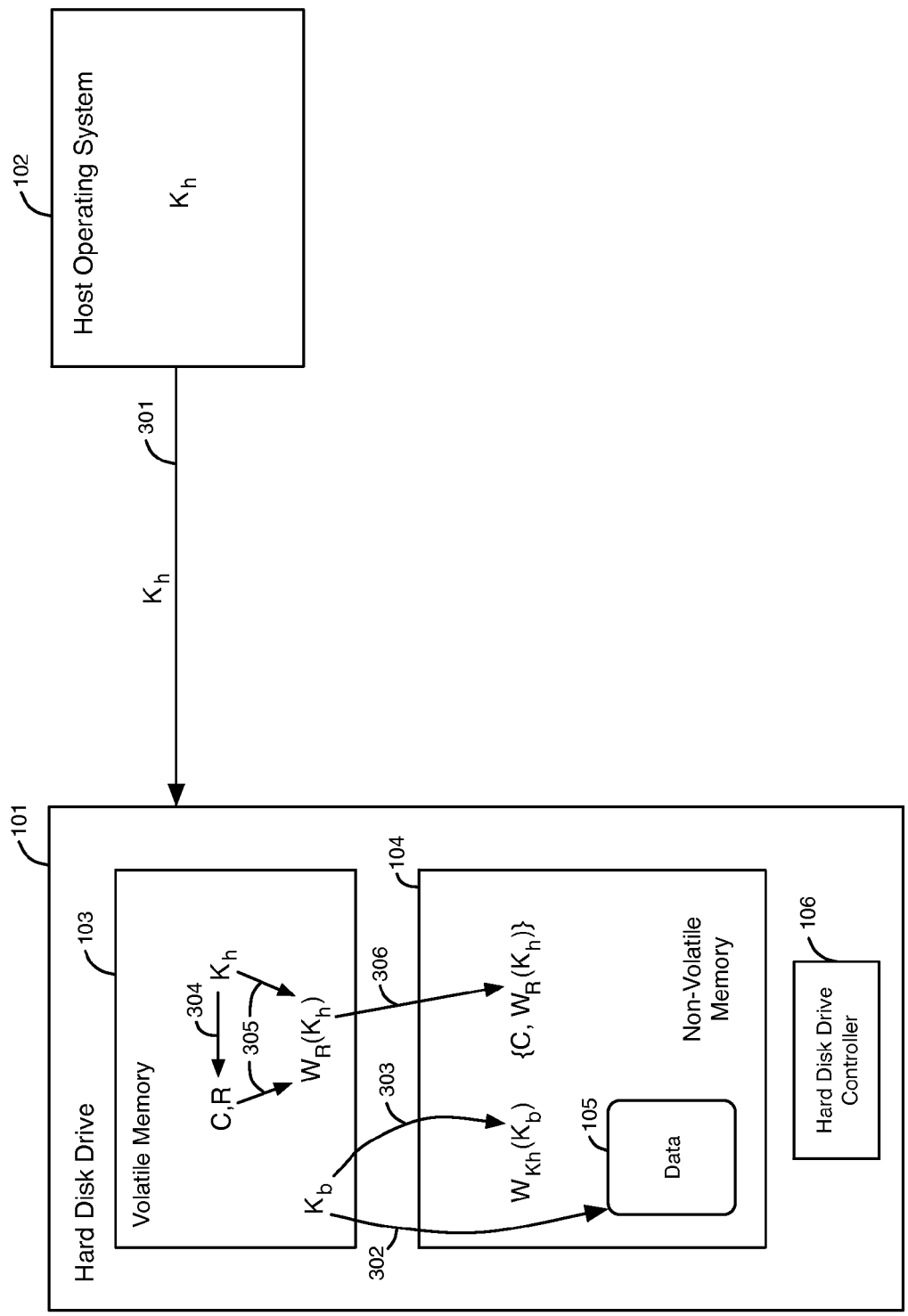
FIG. 3 illustrates an example of a technique for enrolling in a system that secures data stored on a hard disk drive using symmetric keys, according to an embodiment of the present invention.

FIG. 3 illustrates an example of a technique for enrolling in a system that secures data stored on a hard disk drive using symmetric keys, according to an embodiment of the present invention. The technique shown in and described with respect to FIG. 3 relates to a process for enrolling in a data security system. A process for authentication in the data security system is shown in and described with respect to FIG. 4 below.

Host operating system 102 begins by sending a secret symmetric encryption key $K_h$ to hard disk drive 101 at step 301 during the enrollment phase of user data 105. Hard disk drive 101 generates an encryption key $K_b$ and encrypts the data 105 using $K_b$ at step 302. Hard disk drive 101 wraps $K_b$ with $K_h$ to generate $W_{Kh}(K_b)$ and stores $W_{Kh}(K_b)$ on hard disk 104 at step 303.

Hard disk drive 101 creates a challenge and response pair C and R using key $K_h$ at step 304. For example, drive 101 can generate a random number R and encrypt R with $K_h$ to generate challenge number C. Challenge C is decrypted with secret key $K_h$ to regenerate random number R.

At step 305, drive 101 wraps $K_h$ with the response R to the challenge C to generate $W_R(K_h)$. At step 306, hard disk drive 101 stores the pair (C, $W_R(K_h)$) on hard disk 104. After the enrollment process is completed, or after a power cycle, reset, etc., all of the information in volatile memory 103 is erased, including $K_b$, $K_h$, and R. Therefore, $K_b$, $K_h$, and R cannot be read from drive 101, because memory 103 has been erased, and $K_b$, $K_h$, and R were never stored on hard disk 104 in an unwrapped and unencrypted format.

Figure 4:
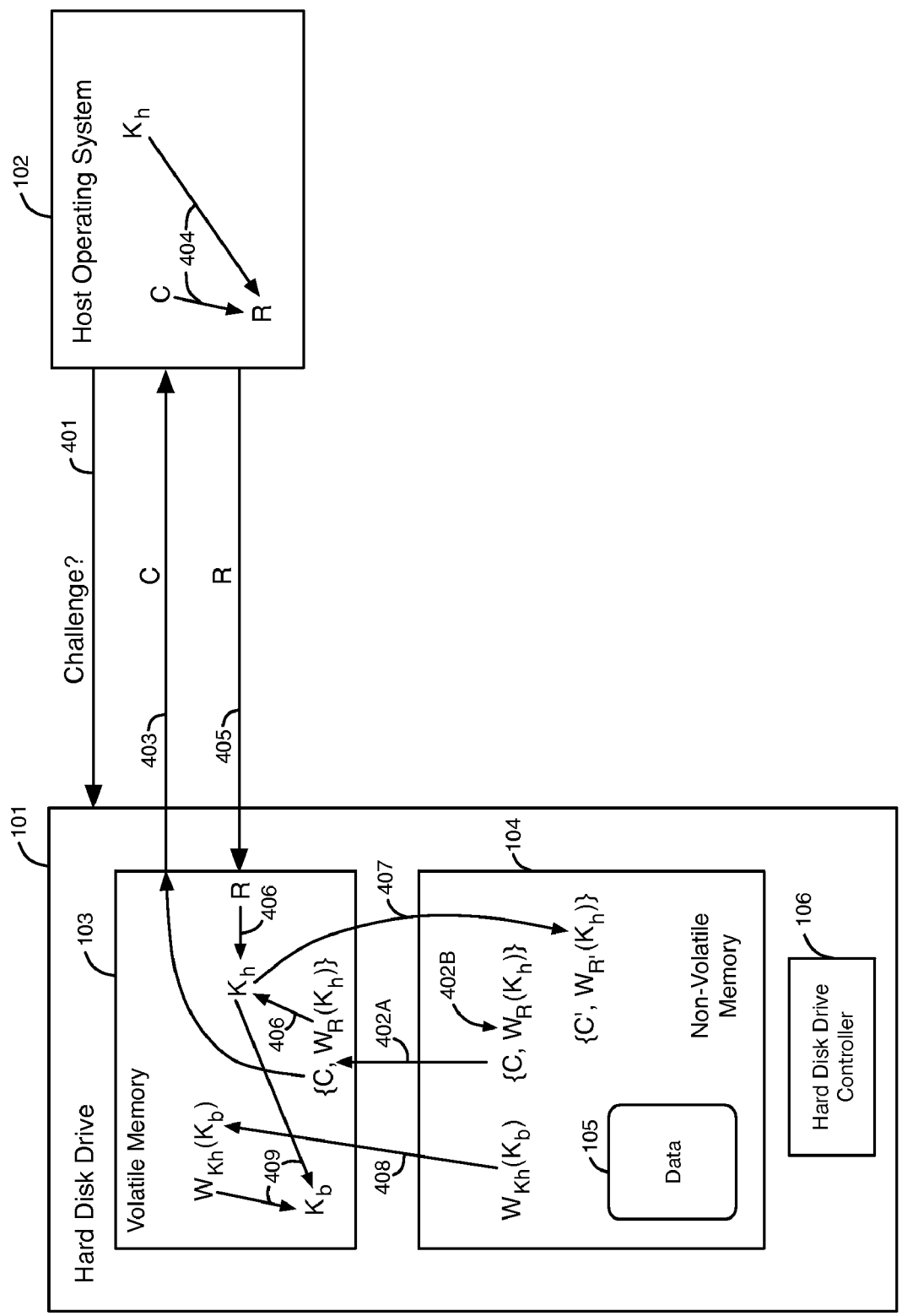
FIG. 4 illustrates an example of a technique for authentication in a system that secures data stored on a hard disk drive using symmetric keys, according to an embodiment of the present invention.

Drive 101 uses integrity measurements as a part of the wrapping and unwrapping processes of FIGS. 3 and 4. After the wrapped number is unwrapped, the integrity measurements use redundancy to provide verification that the unwrapped number is accurate.

FIG. 4 illustrates an example of a technique for authentication in a system that secures data stored on a hard disk drive using symmetric keys, according to an embodiment of the present invention. Hard disk drive 101 authenticates host 102 in steps 401-406, which are shown in FIG. 4 and described below.

The authentication process begins at step 401 when host 102 requests a challenge from hard disk drive 101. In response to receiving a request for a challenge from host 102, hard disk drive 101 reads the pair (C, $W_R(K_h)$) from hard disk 104 and stores the pair (C, $W_R(K_h)$) in volatile memory 103 at step 402A. At step 402B, drive 101 then securely erases pair (C, $W_R(K_h)$) from hard disk 104 before the challenge C is sent to host 102.

At step 403, hard disk drive 101 sends the challenge C to host 102. At step 404, host 102 uses the secret key $K_h$ to generate the response R to the challenge C received from drive 101. The response to the challenge is the random number R. At step 405, host 102 then sends the random number R to hard disk drive 101. At step 406, hard disk drive 101 uses random number R to unwrap the key $K_h$ from wrapped value $W_R(K_h)$. The hard disk drive 101 then uses the integrity measurement that is part of the wrapping function to check whether the key $K_h$ is the correct secret key. If $K_h$ is the correct secret key, then the authentication process is complete, and drive 101 has authenticated host 102.

As mentioned above, pair (C, $W_R(K_h)$) is securely erased from hard disk 104 at step 402B before the challenge C is sent outside drive 101. If hard disk drive 101 does not erase pair (C, $W_R(K_h)$) from hard disk 104 at step 402B, drive 101 is vulnerable to attack by an attacker that intercepts R when it is sent from host 102 at step 405, steals drive 101, and then reads C, $W_R(K_h)$, and $W_{Kh}(K_b)$ from hard disk 104. With R, $W_R(K_h)$, and $W_{Kh}(K_b)$, the attacker can recover $K_b$ and decrypt data 105.

At step 407, hard disk drive 101 generates a new challenge and response pair that includes challenge C' and random number response R'. Also at step 407, drive 101 wraps the key $K_h$ with the new random number response R' to generate $W_{R'}(K_h)$, and then writes the new pair (C', $W_{R'}(K_h)$) on hard disk 104.

The new challenge and response pair C' and R' is used to securely store key $K_h$ on hard disk 104 so that the authentication process of FIG. 4 can be repeated in the future. If $W_{R'}(K_h)$ is not stored on hard disk 104, and a power failure occurs, volatile memory 103 would be erased, and data 105 would not be recoverable, because $W_R(K_h)$ and key $K_h$ would be lost. A new challenge and response pair is generated, because the old challenge and response pair may have been intercepted at steps 403 and 405.

At step 408, hard disk drive 101 reads $W_{Kh}(K_b)$ from hard disk 104. Hard disk drive 101 then uses key $K_h$ to recover the bulk encryption key $K_b$ by unwrapping $K_b$ from $W_{Kh}(K_b)$ at step 409. After $K_b$ has been recovered, hard disk drive 101 can use $K_b$ to decrypt data 105 on hard disk 104.

In the authentication procedure described with respect to FIG. 4, if a power failure occurs during the authentication of the secret key $K_h$, then $K_B$ may be lost forever. To prevent such occurrences, hard disk drive 101 pre-computes several challenge and response pairs, $C_1$ and $R_1$, $C_2$ and $R_2$, $C_3$ and $R_3$, etc., during the enrollment process described above with respect to FIG. 3. The responses $R_1$, $R_2$, $R_3$, etc. can be, for example, random numbers. Each response $R_1$, $R_2$, $R_3$, etc. is encrypted with the secret key $K_h$ to generate the respective challenge $C_1$, $C_2$, $C_3$, etc. Drive 101 wraps the secret key $K_h$ with each of the responses $R_1$, $R_2$, $R_3$, etc. from each of the challenge and response pairs. Drive 101 then stores each of the challenges and their respective wrapped secret keys on hard disk 104. Thus, pairs ($C_1$, $W_{R1}(K_h)$), ($C_2$, $W_{R2}(K_h)$), ($C_3$, $W_{R3}(K_h)$), etc. are stored on hard disk 104.

When a power failure occurs during the authentication process of FIG. 4, hard disk drive 101 can use another challenge and response pair that is stored on disk 104 to complete the authentication process with host 102. Drive 101 can store any desired number N of challenge and response pairs on disk 104 in the form of (C, $W_R(K_h)$). With this technique, host 102 has an N number of authentication attempts that are secure against error conditions. Once a successful authentication occurs, hard disk drive 101 replenishes the challenge and response pairs that are stored on hard disk 104 in the form of (C, $W_R(K_h)$).

The data security techniques described above prevent an attacker from being able to steal data 105 by using code that reads and stores the response R sent to drive 101 from host 102, then stealing drive 101, and reading C and $W_R(K_h)$ from disk 104. Because drive 101 erases $W_R(K_h)$ from disk 104 before each authentication attempt, then wraps $K_h$ with a new challenge and response pair C' and R', and stores (C', $W_{R'}$($K_h$)) on disk 104, an attacker will not be able to decrypt data 105 after intercepting the response R from host 102 and stealing the hard disk drive.

According to an additional embodiment, controls can be added to drive 101 that prevent all the challenge and response pairs from being deleted from disk 104. For example, if the challenge and response pairs are close to being exhausted, drive 101 may require authentication from another authority, e.g., a system administrator, before drive 101 allows further attempts from the failing authority (e.g., host 102).

According to another embodiment, the bulk encryption key $K_b$ can be secured by multiple secret keys $K_{h1}$, $K_{h2}$, ..., $K_{hM}$, corresponding to multiple authorities. One authority can be a system administrator. The system administrator can regenerate a secret key $K_h'$ corresponding to new authentication credentials for a particular user.

According to yet another embodiment, any of the data security techniques described above can be used in a data storage device that has a tamper resistance module to provide increased protection against attacks. For example, $W_{Kh}(K_b)$ and (C, $W_R(K_h)$) can be stored in a tamper resistance module.

The foregoing description of the exemplary embodiments of the present invention has been presented for the purposes of illustration and description. The foregoing description is not intended to be exhaustive or to limit the present invention to the examples disclosed herein. In some instances, features of the present invention can be employed without a corresponding use of other features as set forth. Many modifications, variations, and substitutions are possible in light of the above teachings, without departing from the scope of the present invention.

What is claimed is:

1. A data storage device that comprises code for providing security to data stored on the data storage device, wherein the code is stored on a computer readable medium in the data storage device, the data storage device comprising:

non-volatile memory;

code for generating a first public key and a secret key pair;

code for encrypting data stored in the non-volatile memory using a bulk encryption key, encrypting the bulk encryption key using the first public key to generate an encrypted bulk encryption key, and storing the encrypted bulk encryption key in the non-volatile memory;

code for generating a challenge and response pair, wrapping the secret key with the response to generate a wrapped secret key, and storing the challenge and the wrapped secret key in the non-volatile memory, wherein the challenge is a random number encrypted with a second public key, and wherein the response is the random number that equals the challenge decrypted with a private key;

code for authenticating a host by retrieving the challenge and the wrapped secret key from the non-volatile memory, erasing the challenge and the wrapped secret key from the non-volatile memory, sending the challenge to the host after the challenge and the wrapped secret key have been erased from the non-volatile memory, receiving the response that is generated based on the challenge from the host, and unwrapping the wrapped secret key using the response from the host to regenerate the secret key; and code for decrypting the encrypted bulk encryption key using the regenerated secret key to regenerate the bulk encryption key and decrypting the data stored in the non-volatile memory using the regenerated bulk encryption key.

2. The data storage device defined in claim 1 wherein the code for generating the challenge and the response pair, wrapping the secret key with the response to generate the wrapped secret key, and storing the challenge and the wrapped secret key in the non-volatile memory further comprises code for generating multiple challenge and response pairs, wrapping the secret key with each of the responses to generate wrapped secret keys, and storing the challenges and the wrapped secret keys in the non-volatile memory.

3. The data storage device defined in claim 1 wherein the bulk encryption key, the response, and the secret key are not stored in the non-volatile memory in an unencrypted format.

4. The data storage device defined in claim 1 wherein the data storage device is a hard disk drive and the non-volatile memory is a magnetic hard disk.

5. The data storage device defined in claim 1 wherein the secret key is a symmetric key.

6. The data storage device defined in claim 1 wherein the secret key is an asymmetric key.

7. The data storage device defined in claim 1 wherein the code for encrypting the data stored in the non-volatile memory using the bulk encryption key, encrypting the bulk encryption key using the first public key to generate an encrypted bulk encryption key, and storing the encrypted bulk encryption key in the non-volatile memory further comprises code for wrapping the bulk encryption key to generate a wrapped bulk encryption key and storing the wrapped bulk encryption key in the non-volatile memory.

8. A data storage device comprising:
non-volatile memory that stores data, wherein the data storage device generates a first public key and a secret key pair, encrypts the data using a bulk encryption key, encrypts the bulk encryption key using the first public key to generate an encrypted bulk encryption key, and stores the encrypted bulk encryption key in the non-volatile memory;
wherein the data storage device generates a challenge and response pair, wraps the secret key with the response to generate a wrapped secret key, and stores the challenge and the wrapped secret key in the non-volatile memory, wherein the challenge is a random number encrypted with a second public key, and wherein the response is the random number that equals the challenge decrypted with a private key;
wherein the data storage device authenticates a host by reading the challenge and the wrapped secret key from the non-volatile memory, erasing the challenge and the wrapped secret key from the non-volatile memory, sending the challenge to the host, receiving the response that is generated based on the challenge from the host, and unwrapping the wrapped secret key using the response from the host to regenerate the secret key, and
wherein the data storage device decrypts the encrypted bulk encryption key using the regenerated secret key, and decrypts the data stored in the non-volatile memory using the decrypted bulk encryption key.

9. The data storage device defined in claim 8 wherein the data storage device generates multiple challenge and response pairs, wraps the secret key with each of the responses to generate wrapped secret keys, and stores the challenges and the wrapped secret keys in the non-volatile memory.

10. The data storage device defined in claim 8 wherein the response, the secret key, and the bulk encryption key are not stored in the non-volatile memory in an unencrypted format, and wherein the data storage device wraps the bulk encryption key to generate a wrapped bulk encryption key and stores the wrapped bulk encryption key in the data storage device.

11. The data storage device defined in claim 8 wherein the data storage device is a hard disk drive and the non-volatile memory is a magnetic hard disk.

12. A data storage device comprising:
non-volatile memory that stores data, wherein the data storage device generates a first public key and a secret key pair, encrypts the data using a bulk encryption key, encrypts the bulk encryption key using the first public key to generate an encrypted bulk encryption key, and stores the encrypted bulk encryption key in the non-volatile memory;
wherein the data storage device generates a challenge and response pair, wraps the secret key with a first number that is a function of the response to generate a wrapped secret key, and stores the challenge and the wrapped secret key in the non-volatile memory, wherein the challenge is a random number encrypted with a second public key, and wherein the response is the random number that equals the challenge decrypted with a private key;
wherein the data storage device authenticates a host by reading the challenge and the wrapped secret key from the non-volatile memory, erasing the challenge and the wrapped secret key from the non-volatile memory, sending the challenge to the host, receiving the response that is generated based on the challenge from the host, and unwrapping the wrapped secret key using the first number to regenerate the secret key, and
wherein the data storage device decrypts the encrypted bulk encryption key using the regenerated secret key, and decrypts the data stored in the non-volatile memory using the decrypted bulk encryption key.

13. The data storage device defined in claim 12 wherein the bulk encryption key, the response, the first number, and the secret key are not stored in the non-volatile memory in an unencrypted format.

14. The data storage device defined in claim 12 wherein the data storage device generates multiple challenge and response pairs, wraps the secret key with numbers that are functions of the responses to generate wrapped secret keys, and stores the challenges and the wrapped secret keys in the non-volatile memory.

15. The data storage device defined in claim 12 wherein the function is selected from the group consisting of a padding function, a trimming function, and a hash function.

\* \* \* \* \*